United States Patent
Primo et al.

(10) Patent No.: US 9,475,365 B2
(45) Date of Patent: Oct. 25, 2016

(54) SUNVISOR ASSEMBLY, SUNVISOR CORE AND SUNVISOR

(71) Applicant: GRUPO ANTOLIN INGENIERIA, S.A., Burgos (ES)

(72) Inventors: Ignacio Marcos Primo, Burgos (ES); Vincent Bernard, Rupt-sur-Moselle (FR)

(73) Assignee: GRUPO ANTOLIN INGENIERIA, S.A., Burgos (ES)

( * ) Notice: Subject to any disclaimer, the term of this patent is extended or adjusted under 35 U.S.C. 154(b) by 17 days.

(21) Appl. No.: 14/293,948

(22) Filed: Jun. 2, 2014

(65) Prior Publication Data
US 2014/0354005 A1 Dec. 4, 2014

(30) Foreign Application Priority Data
Jun. 3, 2013 (EP) .................................... 13382210

(51) Int. Cl.
*B60J 3/02* (2006.01)

(52) U.S. Cl.
CPC ............... *B60J 3/0278* (2013.01); *B60J 3/023* (2013.01); *B60J 3/0208* (2013.01); *B60J 3/0217* (2013.01); *B60J 3/0239* (2013.01); *B60J 3/0265* (2013.01); *B60J 3/0282* (2013.01)

(58) Field of Classification Search
CPC .... B60J 3/0265; B60J 3/0208; B60J 3/0239; B60J 3/0282; B60J 3/0217; B60J 3/023; B60J 3/0278
USPC ............ 296/97.1, 97.9, 97.11, 97.12, 97.13, 296/97.5, 97.6, 97.8
See application file for complete search history.

(56) References Cited

U.S. PATENT DOCUMENTS

| | | | | |
|---|---|---|---|---|
| 6,641,198 | B2* | 11/2003 | Crotty et al. | ................ 296/97.1 |
| 8,870,259 | B2* | 10/2014 | Wieczorek et al. | ....... 296/97.12 |
| 2012/0119537 | A1* | 5/2012 | Fukatsu | ................ B60J 3/0278 |
| | | | | 296/97.1 |

* cited by examiner

*Primary Examiner* — Joseph D Pape
*Assistant Examiner* — Dana Ivey

(57) ABSTRACT

Clipped twin-shell sun visor assembly comprising a first shell (1) and a second shell (2) arranged to be joined together for forming a sun visor core, wherein said assembly comprises a plurality of clips (3A, 3B, 3C, 3D; 30A, 30B, 30C, 30D) arranged for interacting with corresponding complementary elements (4A, 4B, 4C, 4D; 40A, 40B, 40C, 40D) so as to join the shells. At least when the shells are joined together, the clips are arranged in groups (3), each group comprising at least a first clip (3A; 30A) and a second clip (3B; 30B). The first clip (3A; 30A) is arranged for blocking movement of a second complementary element (4B, 40B) interacting with said second clip (3B; 30B) in a first sliding direction (A) when the first shell and the second shell are joined together, and the second clip (3B; 30B) is arranged for blocking movement of a first complementary element (4A; 40A) interacting with said first clip (3A) in a second direction sliding (B), when the first shell (1) and the second shell (2) are joined together. This blocking reduces the risk for movements due to manufacturing tolerances.

14 Claims, 9 Drawing Sheets

SUNVISOR ASSEMBLY, SUNVISOR CORE AND SUNVISOR

TECHNICAL FIELD OF THE INVENTION

The present invention relates sunvisors for automobiles, especially to so-called twin-shell sunvisors, and more especially to clipped twin-shell sunvisors.

THE STATE OF THE ART

It is known in the art to manufacture cores for sunvisors for automobiles by joining two shells, commonly known as twin-shells, frequently made of polypropylene. An advantage with this technology is that the polypropylene twin-shells can be produced by a moulding process which makes it possible to obtain very precisely defined and complex parts. In particular, the internal sides of these shells can be shaped to receive, guide and retain, in the desired positions, different components of the sunvisor, such as the arm of the sunvisor, the retention spring member frequently used to keep the sunvisor in a desired position, vanity-pack, light sources, etc., without the need for adding any intermediary supports. This helps to reduce the number of components and the assembly operations needed to produce a sunvisor.

The assembly of the twin-shells can be made by welding or gluing of the perimeter of the twin-shell, or using screws or clips. In the case of the so-called clipped twin-shell sunvisores, the twin-shells are generally kept together by several sets of clips. The male and female parts of these clips are generally integrated directly in the shells, that is, the clips are obtained together with the rest of the shells in the mould. When the two shells are brought together, the male and the female parts interact to keep the shells together. For example, EP-1545918-B1 teaches a sunvisor including a kind of integrally moulded clips to keep two parts of the sunvisor joined together.

A problem frequently involved with clipped twin-shell sunvisors is a lack of rigidity. Due to the moulding tolerances, the clips allow a certain movement between the two shells, so that one of the shell can slide in relation to the other. Basically, due to these moulding tolerances, normally, a male clip can slide at least a small distance in relation to the complementary element, that is, the receiver or female part. This is schematically illustrated in FIG. 1, which schematically illustrates a portion 1000 of a shell with an integrally moulded clip 1001, arranged to interact with a window or opening 1003 arranged in a portion 1002 of the other shell. Due to the need for certain tolerances, to make sure that the clip 1001 will be able to engage with the opening 1003 during assembly of the sunvisor, the opening 1003 is slightly wider than the width of the clip 1001, and therefore, the clip can slide along the opening, as illustrated by the arrow in FIG. 1. Due to this freedom of movement, the stiffness of the body once assembled by the clips is lower than the stiffness obtained with other methods such as welding or gluing Thus, sometimes, the stiffness of the twin-shell core may not be enough to comply with the quality demands imposed by customers. This problem may be even more serious in the case of sunvisors for large vehicles, such as SUVs and utility vehicles.

One way of increasing the stiffness of clipped twin shell sunvisors is by increasing the thickness of the shells, thereby increasing the stiffness of the individual shells and, thereby, the stiffness of the assembled core. However, the mere increase of the thickness of the shells has a rather limited effect on the stiffness, and involves the disadvantage of increased weight and price of the shells. Also, an increase of the thickness of the sunvisor reduces the free space available for placing the sunvisor components.

Another known way of increasing the stiffness of the assembly is by welding or gluing the two shells together. Thereby, a fully closed profile is obtained, and the possibility of relative movement between the shells is strongly reduced. The core comprising the two shells has the geometry of a closed hollow body, the stiffness of which is far higher than the sum of the stiffnesses of the individual shells. Thus, this solution to the problem of lack of stiffness is efficient in that it allows for a substantial increase in stiffness without any need for increased thickness and weight of the components. However, a drawback with this method is that the welding or gluing represents additional manufacturing steps and components, and therefore implies an additional cost in terms of time, labour and equipment.

U.S. Pat. No. 6,557,920-B1 discloses a sunvisor assembly as per the preamble of claim 1, with two shells and with clips interacting with complementary elements in order to join the two shells. The clips are arranged with different orientations and may block sliding in different directions.

DESCRIPTION OF THE INVENTION

A first aspect of the invention relates to a clipped twin-shell sunvisor assembly comprising a first shell and a second shell arranged to be joined together for forming a sunvisor core. The assembly comprises a plurality of clips arranged for interacting with corresponding complementary elements. Each of said clips and each of said complementary elements forms part of one of said first and second shells, preferably as an integrally moulded part thereof. For example, in some embodiments of the invention, all of the clips form part of one of the shells, such as the first shell, whereas all of the complementary elements form part of the other shell. In other embodiments of the invention, one or more of the clips form part of one of the shells, whereas the rest of the clips form part of the other shell. For each clip forming part of one of the shells, the corresponding complementary element forms part of the other shell.

Once joined together, the interaction between the clips and the complementary elements keep the two shells attached to each other and prevents one of the shells from being separated from the other shell.

In accordance with the invention, and at least when the shells are joined together, the clips, or at least some clips, are arranged in groups, each group comprising at least a first clip a second clip and a third clip. The fact that the clips are arranged in groups or clip nodes implies that the clips are placed close together. In a node or group of clips the clips are grouped together so that when the shells are joined together, the clips of a node or group of clips are close to each other. The distance between any clips of a group or node of clips is less than 4 cm, preferably less than 2 cm, as the presence of the mutually blocking clips close to each other may serve to enhance stiffness of the assembly. That is, each clip of a group or node of clips is placed at a distance from the other clips of said group of clips that is less than 4 cm, preferably less than 2 cm. In accordance with the invention, said first clip is arranged for blocking movement of a second complementary element interacting with said second clip in a first sliding direction when the first shell and the second shell are joined together, said second clip is arranged for blocking movement of a first complementary element interacting with said first clip in a second sliding direction, such as a direction substantially perpendicular to said first sliding direction, and said third clip is arranged for blocking movement of the complementary elements in a third sliding direction which is an opposite direction to said first sliding direction, when the first shell and the second shell are joined together. In the present context, the term "sliding direction" refers to a direction in which a shell would move if sliding in relation to the other shell, when the shells are joined together to form the core.

Thus, the combination of the two clips prevents the relative sliding movements between the individual clips and their complementary elements, that is, the kind of sliding movements normally allowed by manufacturing tolerances, for example, due to the fact that a female member is designed oversized to make sure that it can receive the corresponding male member during assembly of the shell, taking manufacturing tolerances into account. This serves to reduce the sliding of the shells in relation to each other, and thus increases the rigidity of the sunvisor core.

In some embodiments of the invention, in each individual group of clips, all of the clips form part of one of the shells, whereas the corresponding complementary elements form part of the other shell. In other embodiments of the invention, in one, more, or all of the groups of clips, one or more of the clips form part of one of the shells, whereas the rest of the clips form part of the other shell.

In some embodiments of the invention, said at least one of said groups of clips additionally comprises at least a fourth clip arranged for blocking movement of the complementary elements in a fourth sliding direction which is an opposite direction to said second sliding direction. The presence of the third and fourth clips can serve to further enhance stiffness, by limiting the possibilities of relative movement between clips and their complementary elements. In some embodiments, one or more of the groups of clips can comprise an even larger amount of clips arranged for blocking movement of the complementary elements in different directions, such as five, six, ten or more clips.

In some embodiments of the invention, the first complementary element is a recess, such as a window, in a first wall portion and said second complementary element is a recess in a second wall portion, for example, wall portion that are part of a projection extending from an inner surface of one of said shells. Said first wall portion and said second wall portion are placed at an angle with respect to each other, for example, at a substantially right angle, that is, an angle of 90 degrees or approximately 90 degrees. For example, these wall portions can form part of reinforcing ribs or of a polygonal element projecting from the inner surface of one of said shells.

In some embodiments of the invention, the complementary elements corresponding to at least one group of clips comprise recesses or openings in a plurality of walls or projections extending from an inner surface of at least one of said shells; these walls or projections can extend from the inner surface of the same shell, or some of the projections can extend from an inner wall of one of the shells, and the other ones can extend from an inner wall of the other shell. These walls or wall portions can form part of reinforcing ribs, or of separate projections extending from said inner surface.

In some embodiments of the invention, said first clip and third clip, as well as said second clip and a fourth clip are configured so as to receive the corresponding complementary elements between said first and third clips, and between said second and fourth clips, respectively. Basically, if only one of these two pairs of clips were present, the corresponding complementary member would be able to slide in one direction between the two clip, said direction being defined by the pair of clips. The second pair of clips blocks this possibility of movement. The two pairs of clips are advantageously oriented at an angle with regard to each other, such as perpendicularly to each other.

In some embodiments of the invention, at least some of the complementary elements are embodied in reinforcing ribs of at least one of said shells.

In some embodiments of the invention, at least some of said clips are embodied in reinforcing ribs of at least one of said shells.

In some embodiments of the invention, the assembly comprises at least four groups of clips, preferably arranged in correspondence with the four corners of the assembly.

In each group of clips, the clips are arranged close to each other, so that each clip of said group of clips is placed at a distance from the other clips of the group of clips that is less than 4 cm, preferably less than 2 cm.

In some embodiments of the invention, in at least one group of clips, all of the clips form part of the same shell.

In some embodiments of the invention, in at least one group of clips, at least one clip forms part of said first shell and at least another clip forms part of the second shell.

In some embodiments of the invention, said first shell and second shell are moulded polypropylene shells.

A second aspect of the invention relates to a sunvisor core comprising a sunvisor assembly as described above.

A further aspect of the invention relates to a sunvisor comprising such a sunvisor core.

The term clip as used herein refers to some kind of elastically deformable member for snap connection or similar of the two shells, by interaction between the clip of one shell and a corresponding complementary element in the other shell. In addition to the clips that form part of a group of clips as explained herein, the assembly may obtain additional clips.

A complementary element can be any kind of suitable element for providing a snap connection by engagement with the corresponding clip; for example, some or all of the complementary elements can be recesses or windows formed in some kind of projection or projections from the inner surface of one of the shells, for example, in reinforcing ribs or other parts or elements extending from the inner surface; the inner surface is the surface that will be facing a corresponding inner surface of the other shell when the shells are joined together to form the core. Alternatively o complementarily, all or some of the complementary elements can, for example, be in the form of a wider top edge of a rib or other protrusion from the surface of the second shell, so that one or two flexible portions of a clip can retain said wider top edge by engaging said edge by snap connection during assembly of the core. On the other hand, also the complementary elements can be elastically deformable and actually be constituted by clips. For example, in some embodiments of the invention, the clips and their corresponding complementary elements have the same or similar shapes.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as an example of how the invention can be carried out. The drawings comprise the following figures.

DESCRIPTION OF EMBODIMENTS OF THE INVENTION

Figure 1:
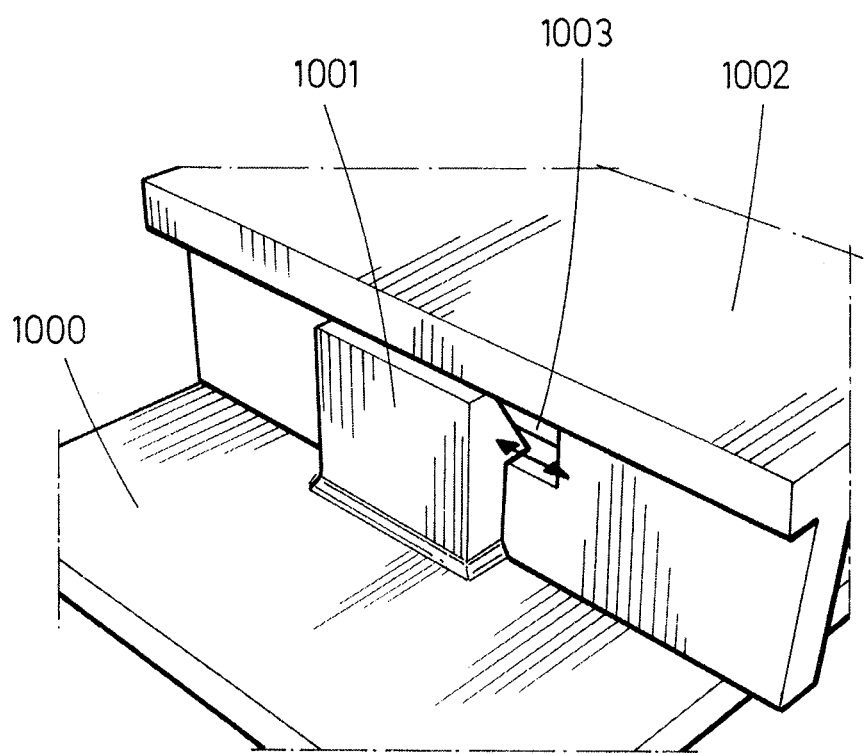
FIG. 1 schematically illustrates how, in a prior art device, a single clip can slide in relation to an opening in which it is inserted.
Figure 2:
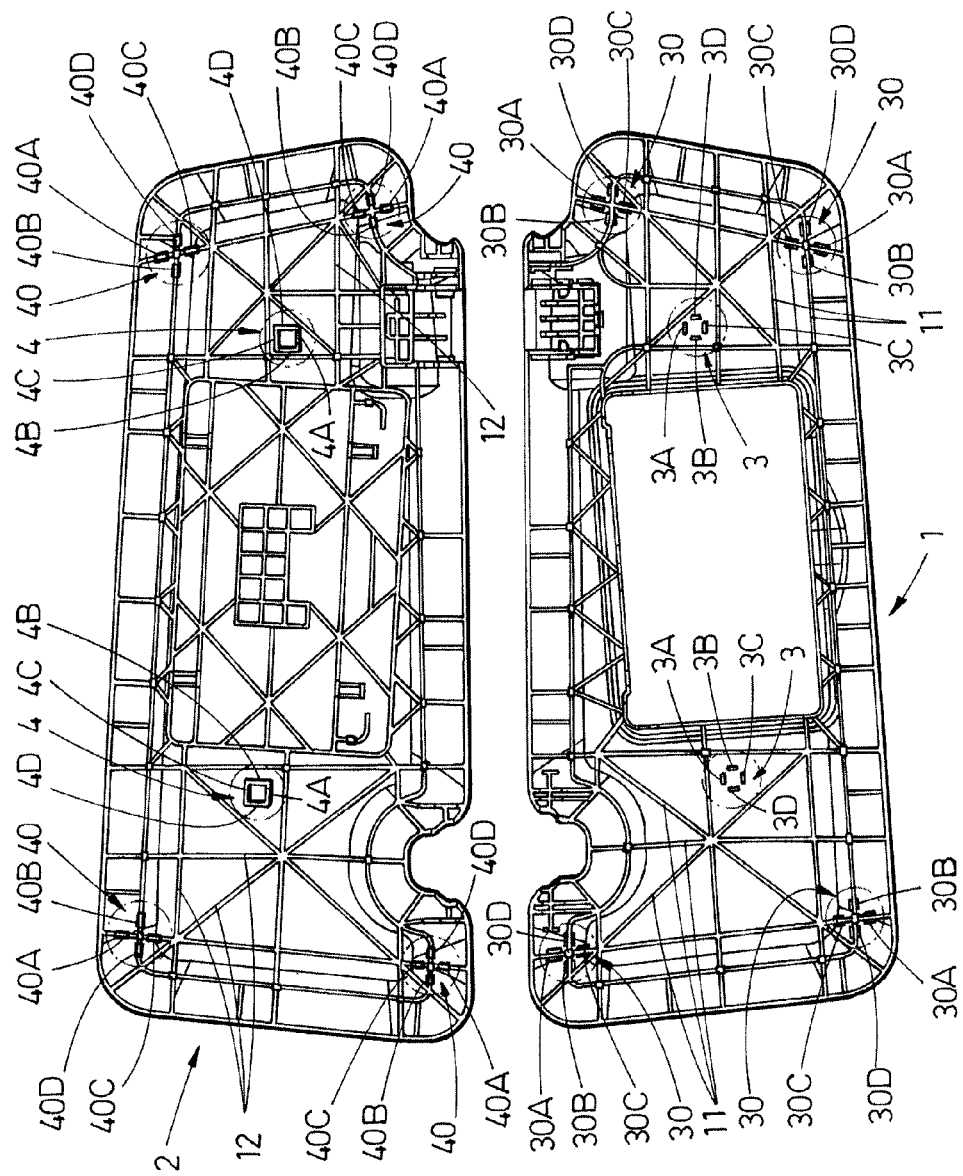
FIG. 2 illustrates two shells of an assembly in accordance with one embodiment of the invention.

FIG. 2 schematically illustrates two twin shells of a twin-shell assembly for the core of a sunvisor, namely, a first shell 1 comprising a plurality of reinforcing ribs 11, and a second shell 2 comprising a plurality of reinforcing ribs 12. Each shell is made of injection moulded polypropylene. Reference numbers 30A, 30B, 30C and 30D represent schematically indicated clips, arranged in four groups of clips 30 in the first shell. These clips are arranged to interact with corresponding complementary 40A, 40B, 40C and 40D, likewise arranged in four groups 40, in the second shell, so as to keep the two shells together. In addition, reference numbers 3A, 3B, 3C and 3D schematically illustrate clips arranged in two groups 3 and arranged to interact with respective openings 4A, 4B, 4C and 4D arranged in two square projections 4 extending from the inner surface of the second shell. The clips and the complementary elements such as the rectangular projections 4 are integrally moulded parts of the respective shells 1 and 2.

Figure 3:
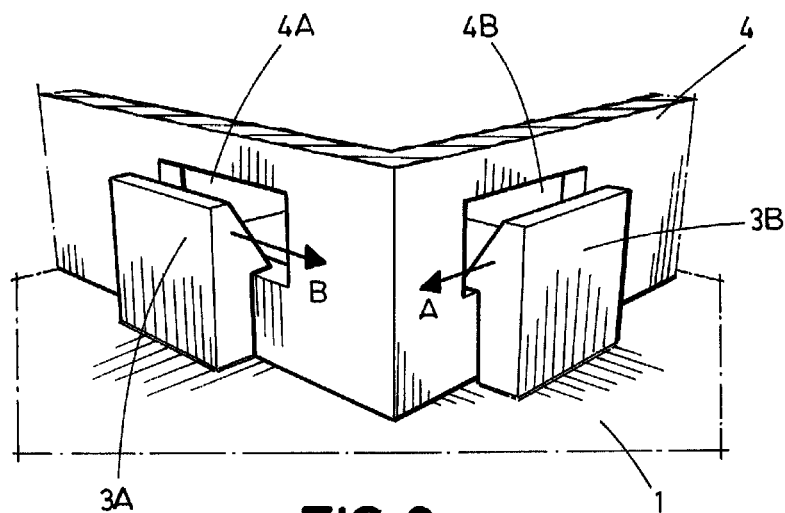
FIG. 3 schematically illustrates two clips and corresponding female elements in accordance with one possible embodiment of the invention.

FIG. 3 schematically illustrates a first clip 3A and a second clip 3B of one of said groups of clips 3; the clips are identical but the second clip 3B is rotated by an angle of 90 degrees with regard to said first clip 3A. The clips extend from the inner surface of the first shell and interact with respective windows 4A and 4B of a projecting portion 4 which is part of the second shell, so as to keep the two shells joined together. Due to the need for manufacturing tolerances, the window 4A is slightly wider than the width of the first clip 3A, and the window 4B is slightly wider than the width of the second clip 3B. Thus, basically, if the second clip were not present, the first window 4A would be able to slide along the first clip 3A in the first sliding direction A illustrated by an arrow in FIG. 3. Likewise, if the first clip 3A were not present, the second window 4B would be able to slide in the second sliding direction B likewise illustrated by an arrow in FIG. 3. However, due to the presence of the two clips 3A and 3B oriented at an angle of about 90 degrees with regard to each other, the first clip 3A blocks the sliding of the second window 4B in the first sliding direction A and the second clip 3B blocks the sliding of the first window 4A in the second sliding direction B. Thereby, stiffness of the assembly is enhanced.

Figure 4A:
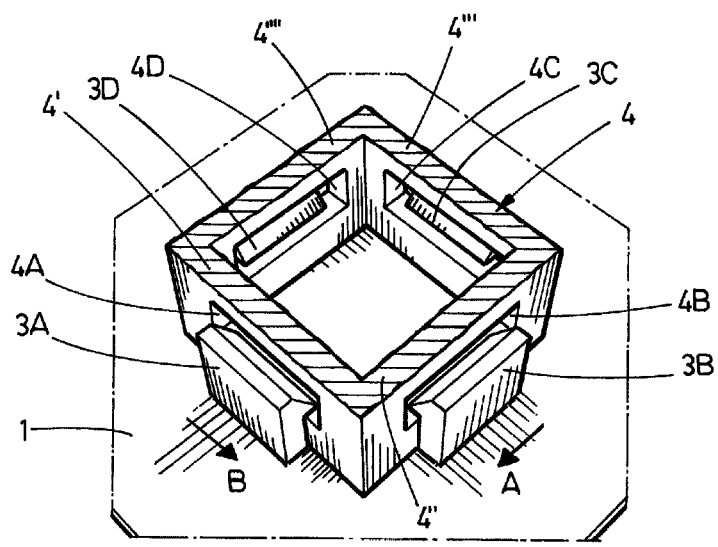
FIG. 4A is a schematic perspective view of a group of clips and the complementary female elements in accordance with one possible embodiment of the invention.
Figure 4B:
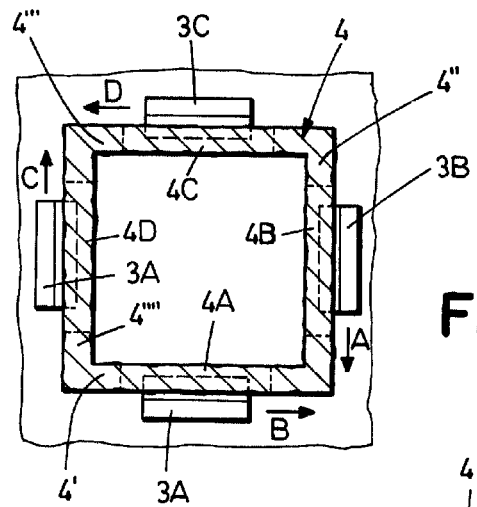
FIG. 4B is a top plan view of the embodiment shown in FIG. 4A.

Although two clips arranged accordingly can be enough to enhance stiffness, in accordance with the invention there are more clips, such as three or four clips. FIGS. 4A and 4B illustrate an arrangement as per FIG. 3, but here the group of clips 3 (cf. FIG. 2) comprises four clips 3A, 3B, 3C and 3C, each of them engaged with a corresponding window 4A, 4B, 4C and 4D embodied in a substantially square and hollow projection 4, comprising four walls 4', 4", 4'", 4"", extending from the inner surface of the second shell. Thus, the clips retain said square projection and thereby prevent the second shell from being removed from said first shell. That is, during assembly, the second shell is pressed against the first shell, and the square projection 4 then forces the clips to elastically bend outwards, and once the second shell is sufficiently close to said first shell (in practice, when it is touching said first shell), the clips 3A, 3B, 3C and 3C snap into the respective windows 4A, 4B, 4C and 4D, whereby the first shell 1 retains the second shell.

In FIG. 4B it is illustrated how the first clip 3A prevents the square projection 4 (and, thus, the corresponding windows) from moving in the first sliding direction A; the second clip 3B prevents the square projection with its windows from moving in the second sliding direction B. The third clip 3C prevents the square projection 4A from moving in the third sliding direction C, and the fourth clip 3D prevents the square projection from moving in the fourth sliding direction D.

Figure 5:
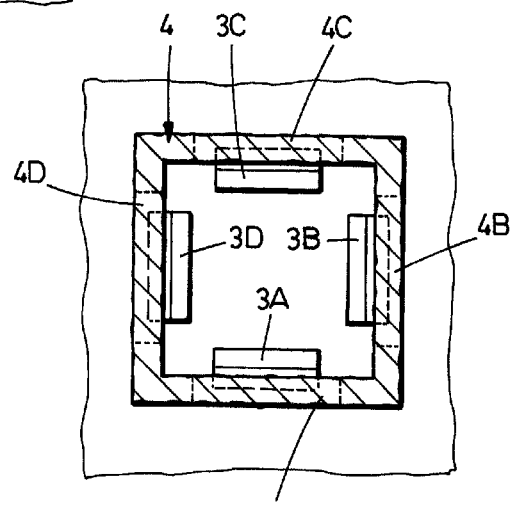
FIG. 5 is a top plan view of a group of clips and the complementary female elements according to an alternative embodient of the invention.

FIG. 5 schematically illustrates a variant of the embodiment shown in FIGS. 4A-4B; in this variant, the clips 3A-3D are arranged within the square projection 4, that is, the clips are closer to each other and extend into the corresponding windows 4A-4D from within the square projection.

Figure 6:
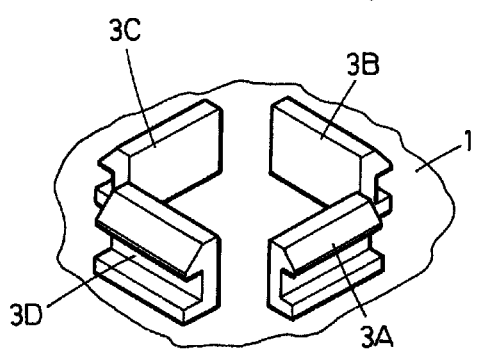
FIG. 6 is a perspective view of a group of clips according to a possible embodiment of the invention.

FIG. 6 shows the clips 3A-3D in a perspective view. Of course, instead of using a square projection with windows acting as the complementary elements, one could provide the second shell with clips similar to the clips 3A-3D, but slightly offset, so as to interact with the clips of the first shell to provide the locking of the shells to each other.

Figure 7A:
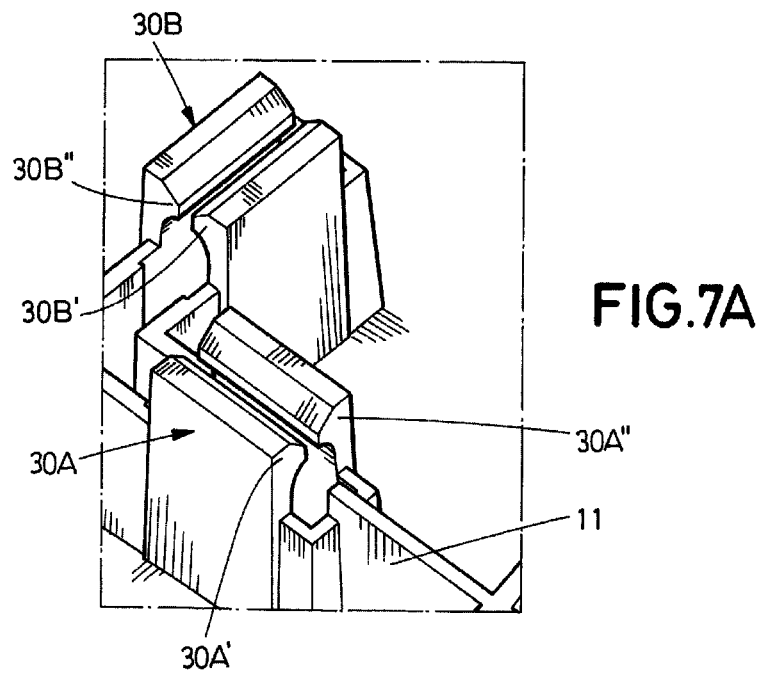
FIGS. 7A and 7B are schematic perspective views of another group of clips and complementary male elements, in accordance with an embodiment the invention.
Figure 7B:
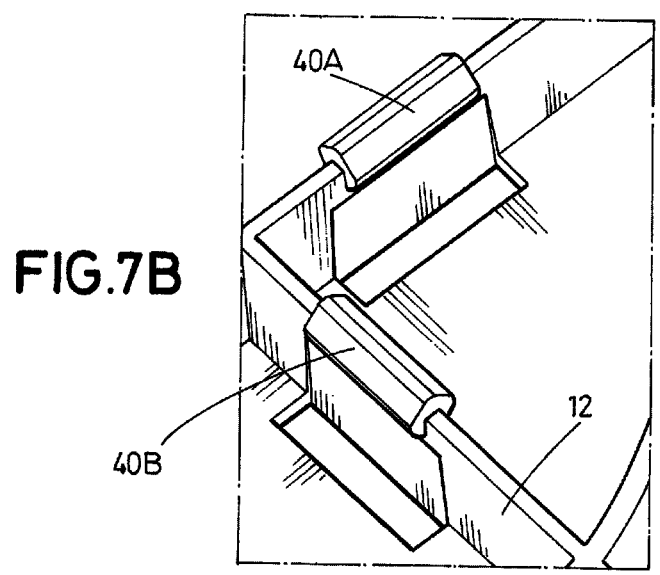

FIGS. 7A and 7B schematically illustrate an alternative embodiment of the clips and of the corresponding complementary elements. In this case, the clips form double clips, each of said double clips or pairs of clips comprising two flexible parts or clips 30A', 30A" and 30B', 30B", respectively, facing each other, and the complementary elements 4A and 40B are designed to be inserted between these clips so as to be retained between them. The first pair of clips 30A prevents the complementary elements from being displaced in the first sliding direction, and the second pair of clips 30B prevents the complementary elements from being displaced in the second sliding direction. In this case, the two double clips 30A and 30B can be enough to prevent relative movement between the clips and the complementary elements. Both the clips and the complementary elements are arranged in correspondence with, and/or extend from, reinforcing ribs 11, 12 of the corresponding shell.

Figure 8A:
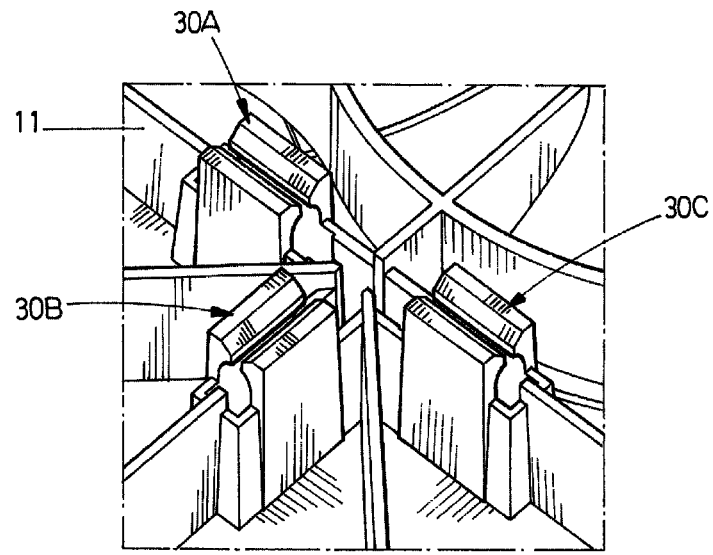
FIGS. 8A, 8B, 9A and 9B show variants of the embodiment shown in FIGS. 7A and 7B.
Figure 8B:
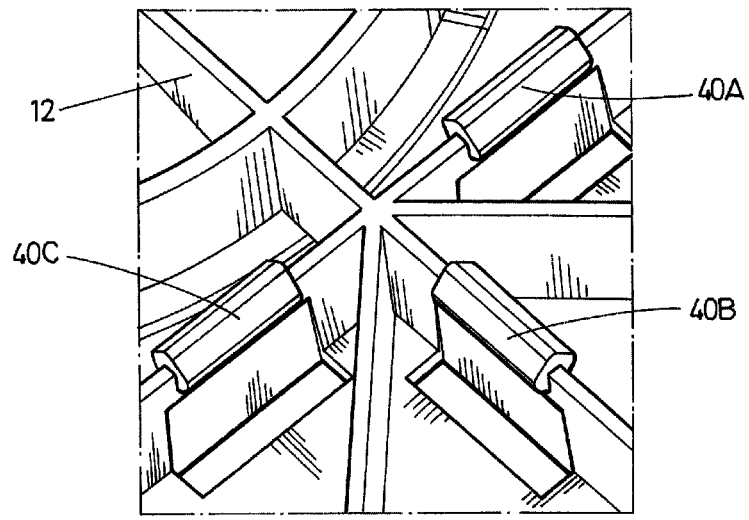
Figure 9A:
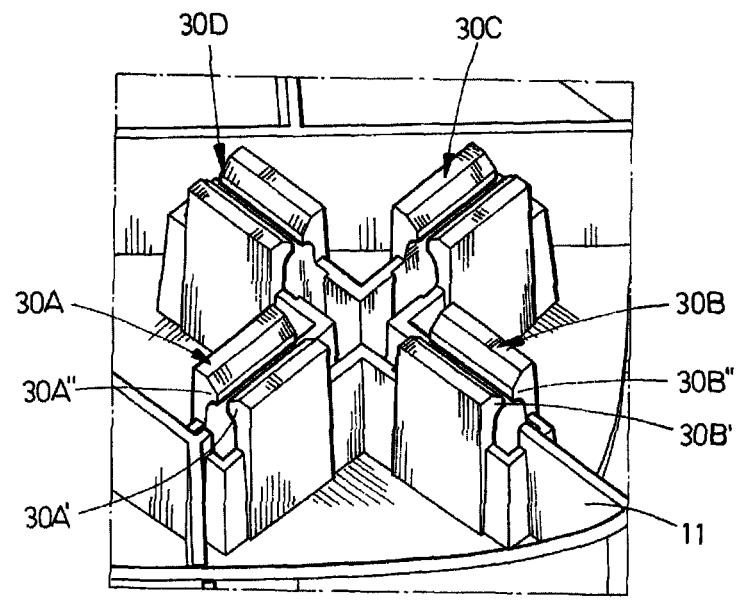
Figure 9B:
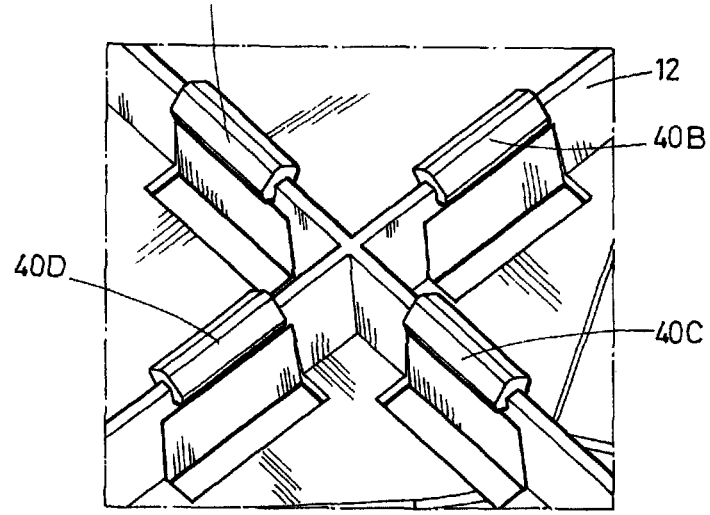

FIGS. 8A and 8B schematically illustrate an alternative embodiment with three pairs of double clips 30A, 30B, 30C and complementary elements 40A, 40B and 40C, and FIGS. 9A and 9B schematically illustrate an embodiment with four such pairs, 30A, 40A; 30B, 40B; 30C, 40C; 30D and 40D.

Returning to FIG. 2, it can be observed how the first shell comprises four groups 30 of such double clips 30A, 30B, 30C and 30D, arranged in correspondence with reinforcing ribs 11 of the first shell. In addition, and separate from these reinforcing ribs, there are also two groups 3 of the simple clips 3A, 3B, 3C and 3D described above. The corresponding complementary elements are integrally moulded parts of the second shell.

Figure 10A:
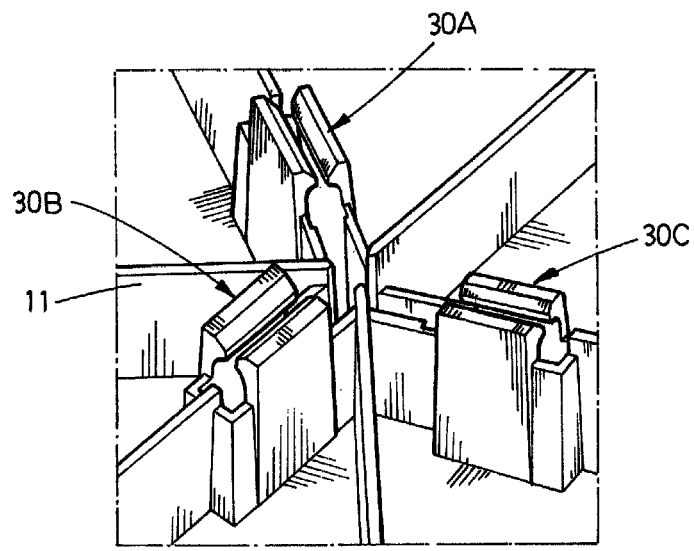
FIGS. 10A and 10B illustrate a variant of the embodiment of FIGS. 8A and 8B.
Figure 10B:
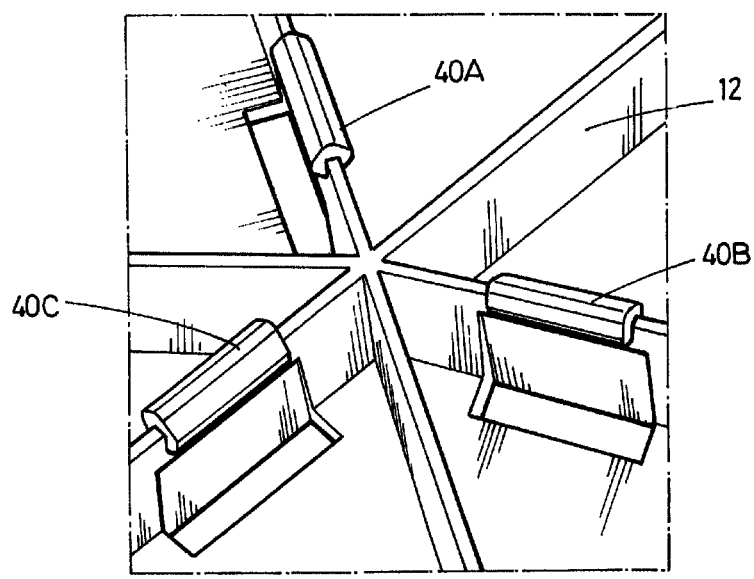

FIGS. 10A and 10B illustrate an alternative embodiment, which differs from the one of FIGS. 8A and 8B in that the angles between the adjacent clips and the adjacent complementary elements are not 90 degrees, but 120 degrees. Obviously, the angles between adjacent clips or adjacent complementary elements can be set at other values than 90 degrees or 120 degrees.

Figure 11A:
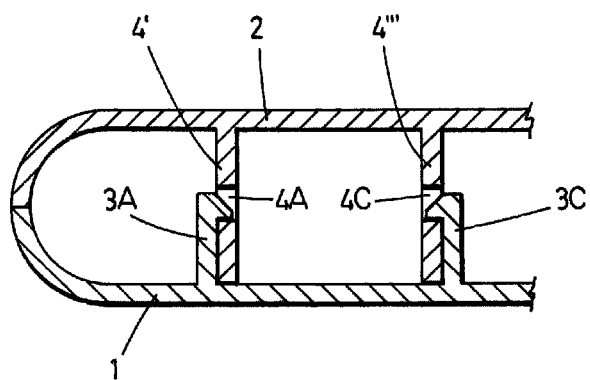
FIGS. 11A and 11B are schematic cross sectional views of two embodiments of the invention.

FIG. 11A is a schematic cross sectional partial view of an assembly in line with the embodiments of FIGS. 4A and 4B; it can be observed how the walls 4' and 4''' form part of the second shell 2, whereas the clips 3A and 3C form part of the first shell 1. However, as explained above, it is not necessary that all of the clips of a group of clips form part of one shell, whereas the corresponding complementary elements form part of the other shell.

Figure 11B:
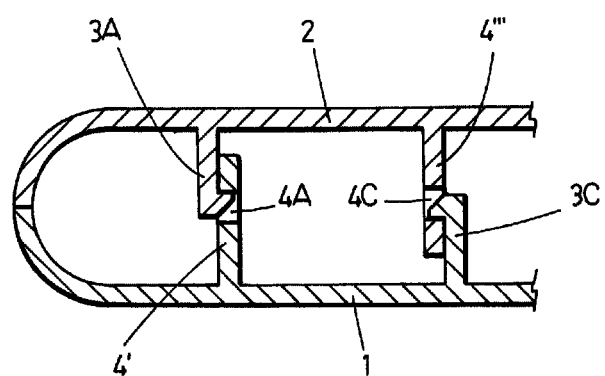

FIG. 11B illustrates an alternative embodiment, in which one clip 3A forms part of the second shell and engages in a window 4A in a wall 4' or projection or rib forming part of the first shell, whereas another clip 3C, of the same group of clips, forms part of the first shell 1 and engages in a window 4C of a wall 4''' or projection or rib forming part of the second shell.

Generally, in each group, the clips are close together, for example, grouped together within a square or circular area of less than 36 cm$^2$, preferably less than 25 cm$^2$, more preferably less than 16 cm$^2$, more preferably less than 9 cm$^2$, and even more preferably less than 6 cm$^2$ or even less than 4 cm$^2$. The presence of the mutually blocking clips close to each other may serve to enhance stiffness of the assembly.

In this text, the term "comprises" and its derivations, (such as "comprising", etc., should not be understood in an excluding sense, that is, these terms should not be interpreted as excluding the possibility that what is described and defined may include further elements, steps, etc.

On the other hand, the invention is obviously not limited to the specific embodiments described herein, but also encompasses any variations that may be considered by any person skilled in the art, for example, as regards the choice of materials, dimensions, components, configuration, etc., within the general scope of the invention as defined in the claims.

The invention claimed is:

1. Clipped twin-shell sun visor assembly comprising a first shell (1) and a second shell (2) arranged to be joined together for forming a sun visor core, wherein the sun visor assembly comprises a plurality of clips (3A, 3B, 3C, 3D, 30A', 30A", 30B', 30B", 30C', 30C", 30D', 30D") arranged for interacting with corresponding complementary elements (4A, 4B, 4C, 4D, 40A, 40B, 40C, 40D), each of the clips and each of the complementary elements forming part of one of the shells, characterized in that at least when the shells are joined together, the clips are arranged in groups (3, 30) of clips wherein in each group (3, 30) of clips, the clips are arranged so each clip is placed at a distance from the other clips that is less than 4 cm, each group comprising at least a first clip (3A, 30A'), a second clip (3B, 30B'), and a third clip (3C, 30A") wherein the first clip (3A, 30A') is arranged for blocking movement of a second complementary element (4B, 40B) interacting with the second clip (3B, 30B') in a first sliding direction (A) when the first shell and the second shell are joined together, wherein the second clip (3B, 30B') is arranged for blocking movement of a first complementary element (4A, 40A) interacting with the first clip (3A) in a second sliding direction (B), when the first shell (1) and the second shell (2) are joined together and wherein the third clip (3C, 30A") is arranged for blocking movement of the complementary elements in a third sliding direction (C) which is an opposite direction to the first sliding direction (A), when the first shell (1) and the second shell (2) are joined together.

2. Clipped twin-shell sun visor assembly according to claim 1, wherein at least one of the groups of clips comprises at least a fourth clip (3D, 30B") arranged for blocking movement of the complementary elements in a fourth sliding direction (D) which is an opposite direction to the second sliding direction (B).

3. Clipped twin-shell sun visor assembly according to claim 1, wherein the first complementary element (4A) is a recess in a first wall portion (4') and the second complementary element (4B) is a recess in a second wall portion (4"), wherein the first wall portion (4') and the second wall portion (4") are placed at an angle with respect to each other.

4. Clipped twin-shell sun visor assembly according to claim 3, wherein the angle is a substantially right angle.

5. Clipped twin-shell sun visor assembly according to claim 1, wherein the complementary elements (4A, 4B, 4C, 4D) corresponding to at least one group of clips (3A, 3B, 3C, 3D) comprise recesses or openings in a plurality of walls (4', 4", 4''', 4'''') or projections extending from an inner surface of at least one of the shells (1, 2).

6. Clipped twin-shell sun visor assembly according to claim 1, wherein the first clip (30A') and third clip (30A") as well as the second clip (30B') and a fourth clip (30B") are configured so as to receive the corresponding complementary elements (40A, 40B) between the first and third clips and between the second and fourth clips, respectively.

7. Clipped twin-shell sun visor assembly according to claim 1, wherein at least some of the complementary elements are embodied in reinforcing ribs (12) of at least one of the shells.

8. Clipped twin-shell sun visor assembly according to claim 1, wherein at least some of the clips are embodied in reinforcing ribs (12) of at least one of the shells.

9. Clipped twin-shell sun visor assembly according to claim 1, wherein in each group of clips (3, 30), the clips are arranged so that each clip is placed at a distance from the other clips that is less than 2 cm.

10. Clipped twin-shell sun visor assembly according to claim 1, wherein, in at least one group of clips, all of the clips form part of the same shell (1).

11. Clipped twin-shell sun visor assembly according to claim 1, wherein, in at least one group of clips, at least one clip forms part of the first shell (1) and at least another clip forms part of the second shell (2).

12. Clipped twin-shell sun visor assembly according to claim 1, wherein the first shell (1) and second shell (2) are moulded polypropylene shells.

13. Clipped twin-shell sun visor assembly according to claim 1, with the first shell (1) and the second shell (2) joined together.

14. Clipped twin-shell sun visor assembly comprising a sun visor core according to claim 13.

* * * * *